United States Patent

Taniguchi et al.

[11] Patent Number: 5,225,918
[45] Date of Patent: Jul. 6, 1993

[54] HOLOGRAM SCALE, APPARATUS FOR MAKING HOLOGRAM SCALE, MOVING MEMBER HAVING HOLOGRAM SCALE ASSEMBLED HOLOGRAM SCALE AND APPARATUS FOR MAKING ASSEMBLED HOLOGRAM SCALE

[75] Inventors: Kayoko Taniguchi; Hideki Tsuchiya, both of Kanagawa, Japan

[73] Assignee: Sony Magnescale, Inc., Tokyo, Japan

[21] Appl. No.: 731,323

[22] Filed: Jul. 17, 1991

[30] Foreign Application Priority Data

Jul. 18, 1990 [JP] Japan .................................. 2-190146
Jul. 19, 1990 [JP] Japan .................................. 2-191145

[51] Int. Cl.⁵ .............................................. G03H 1/20
[52] U.S. Cl. ........................................ 359/12; 359/26; 359/30
[58] Field of Search .................. 359/10, 12, 11, 22, 359/25, 26, 30; 250/237 G

[56] References Cited

U.S. PATENT DOCUMENTS

| | | | |
|---|---|---|---|
| 3,647,289 | 3/1972 | Weber | 359/12 |
| 3,758,186 | 9/1973 | Brumm | 359/12 |
| 3,838,903 | 10/1974 | Leith et al. | |
| 4,206,965 | 6/1980 | McGrew | |
| 4,676,645 | 6/1987 | Taniguchi et al. | 250/237 G |
| 4,715,670 | 12/1987 | Turukhano | |
| 4,790,612 | 12/1988 | Dickson | 359/12 |

Primary Examiner—Martin Lerner
Attorney, Agent, or Firm—Lewis H. Eslinger; Jay H. Maioli

[57] ABSTRACT

An apparatus for making a hologram scale is comprised of a reference diffraction grating on which a light becomes incident and from or by which the incident light is emitted or reflected as a diffracted light, and a recording material, wherein at least two diffracted lights of the diffracted light are caused to interfere with each other as an object wave and a reference wave so as to form a hologram scale on the recording material. Further, an apparatus for making an assembled hologram scale, a hologram scale, an assembled hologram scale and a moving member having a hologram scale are also provided.

6 Claims, 7 Drawing Sheets

HOLOGRAM SCALE, APPARATUS FOR MAKING HOLOGRAM SCALE, MOVING MEMBER HAVING HOLOGRAM SCALE ASSEMBLED HOLOGRAM SCALE AND APPARATUS FOR MAKING ASSEMBLED HOLOGRAM SCALE

BACKGROUND OF THE INVENTION

1. Field of the Invention

The present invention generally relates to apparatus for making a hologram scale and, more particularly, is directed to an apparatus for making a hologram scale, an apparatus for making an assembled hologram scale, a hologram, an assembled hologram scale and a moving member having a hologram scale for use with a numerical control (NC) machine tool, a precision length measuring machine or a high accuracy displacement measuring apparatus.

2. Description of the Prior Art

Recently, a laser scale formed by the combination of a semiconductor laser and a hologram scale has become popular as a displacement measuring apparatus of high precision because it provides high resolution and excellent stability.

Figure 1:
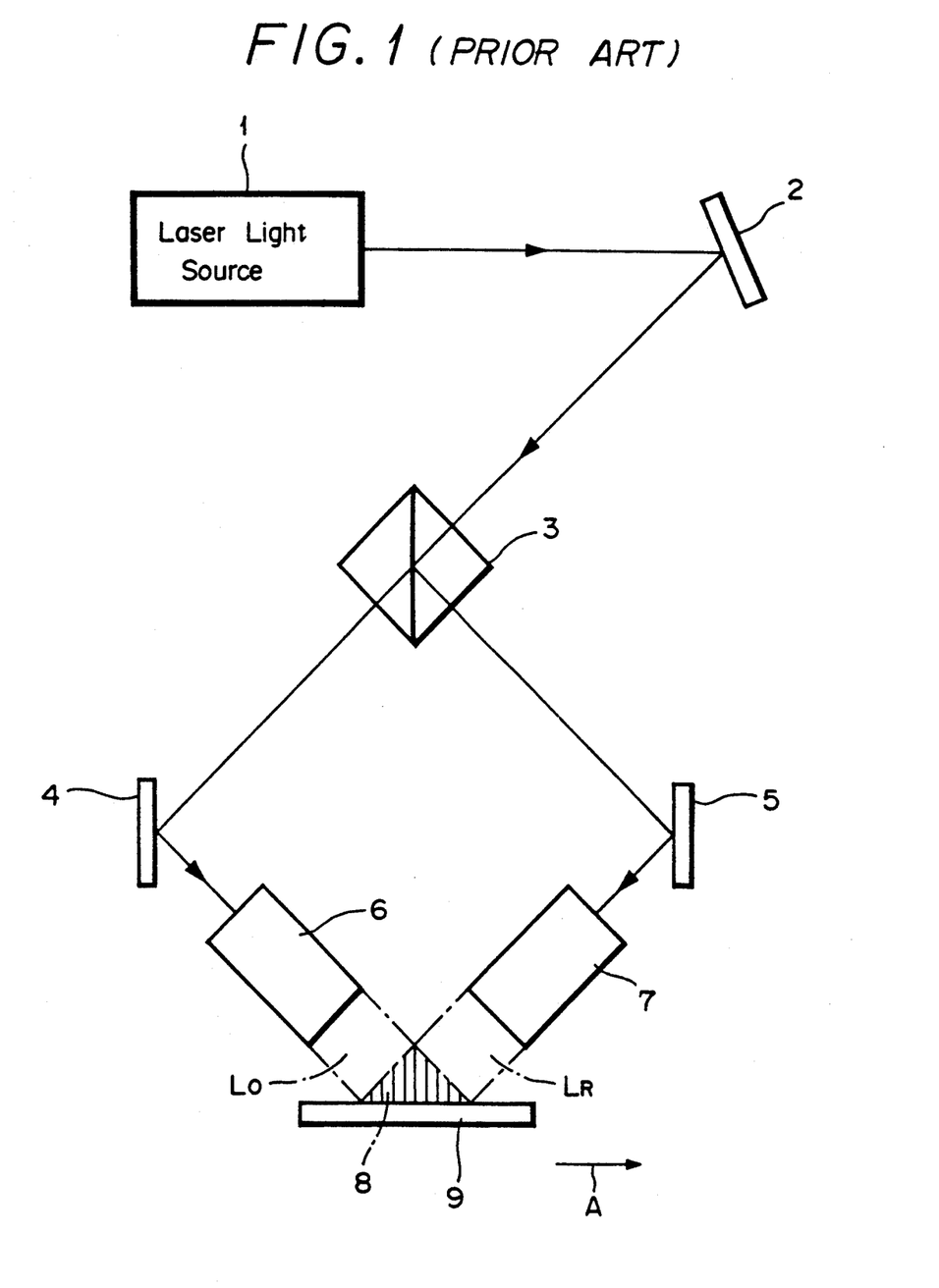
FIG. 1 is a schematic diagram showing an example of an apparatus for making a hologram scale according to the prior art.

A conventional hologram scale is constructed as, for example, shown in FIG. 1.

Referring to FIG. 1, there is provided a laser light source 1 which emits a laser light. The laser light emitted from the laser light source 1 is reflected by a mirror 2 and then split by a beam splitter 3. The thus split laser beams are respectively reflected by mirrors 4, 5 and introduced to beam expanders 6, 7 provided as large aperture magnifying optical systems, in which they are expanded to provide an object wave $L_0$ and a reference wave $L_R$ as plane wave. The object wave $L_0$ and reference wave $L_R$ are superimposed to produce an interference fringe 8. This interference fringe 8 is exposed on a recording material 9 as a hologram scale, thereby forming the hologram scale.

In the conventional apparatus for producing the hologram scale, however, the optical path of the laser light for making the interference fringe 8 is relatively long. There is then the problem that linearity and average grating pitch of the thus produced hologram scale fluctuate because of the change of ambient temperature or the change of environmental conditions, such as the flow of air or the like.

Particularly, when the recording material 9 shown in FIG. 1 is moved in the direction shown by an arrow A in FIG. 1 in order to produce a long hologram scale or the like, a lot of time is needed to produce the long hologram, which unavoidably produces nonlinear.

Further, since the dimension of the optical system is relatively large, there is then the problem that linearity fluctuates even because of a very small vibration of the optical system. Accordingly, the hologram scale recording apparatus must be designed so as to have an expensive earthquake-resistant structure. However, even when the hologram scale recording apparatus is arranged as the earthquake-resistant type, it is very difficult to construct the hologram scale of high accuracy.

Since a magnifying optical system having a large aperture is needed, the interference angle cannot be made constant without difficulty.

When the exposure and recording are carried out again by moving the recording material 9 shown in FIG. 1 in the direction shown by the arrow A in FIG. 1 after the interference fringe 8 is exposed once on the recording material 9 in order to construct the long hologram scale, that is, when a so-called continuous exposure and/or recording is carried out, it takes a lot of time to construct the hologram scale. Besides, since the interference fringe 8 is not stable, then it becomes very difficult to match the phases of the two interference fringes formed on the recording material 9 with high accuracy. As a consequence, there is then the problem that the long continuous hologram scale of high precision cannot be constructed without great difficulty.

As earlier noted, since the dimension of the optical system of the apparatus for making the long continuous hologram scale is increased relatively, the linearity of the hologram scale fluctuates even because of a very small vibration of the optical system. Accordingly, the conventional continuous hologram scale must be designed so as to have an expensive earthquake-resistant structure. Even when such expensive earthquake-resistant structure is employed, it is impossible to construct the long continuous hologram scale without difficulty.

Furthermore, it is proposed that the continuous recording is carried out while the phase is being observed by an interferometer unitarily formed with the recording material 9 which constructs the continuous hologram scale forming apparatus. In this case, however, the vibration on the recording material 9 and the vibration of the wave surfaces caused by the flow of air at the portion where the object wave $L_0$ and the reference wave $L_R$ overlap each other are not the same in cycle and in phase, so that the continuous recording cannot be made properly.

OBJECTS AND SUMMARY OF THE INVENTION

Accordingly, it is an object of the present invention to provide an improved apparatus for making a hologram scale in which the aforementioned shortcomings and disadvantages of the prior art can be eliminated.

More specifically, it is an object of the present invention to provide an apparatus for making a hologram scale in which the arrangement thereof can be simplified.

Another object of the present invention is to provide an apparatus for making a hologram scale in which an accurate hologram scale having excellent linearity and whose grating pitch can be prevented from fluctuating can be formed.

Still another object of the present invention is to provide a hologram scale which can be exposed and recorded under the condition that a recording material is attached to a moving member.

Still another object of the present invention is to provide an assembled hologram scale which can be exposed and recorded under the condition that a recording material is attached to a moving member.

A further object of the present invention is to provide an apparatus for making an assembled hologram scale in which the aforementioned shortcomings and disadvantages of the prior art can be eliminated.

Yet a further object of the present invention is to provide a moving member having a hologram scale in which the aforementioned shortcomings and disadvantages of the prior art can be eliminated.

As a first aspect of the present invention, an apparatus for making a hologram scale comprises a reference diffraction grating on which a light becomes incident and from or by which the incident light is emitted or reflected as a diffracted light, and a recording material, wherein at least two diffracted beams of the diffracted light are caused to interfere with each other as an object wave and a reference wave so as to form a hologram scale on the recording material.

As a second aspect of the present invention, a hologram scale is characterized in that at least two diffracted beams are caused to interfere with each other so as to form a hologram scale on a recording material.

As a third aspect of the present invention, a hologram scale and an assembled hologram scale are formed by the above-mentioned apparatus.

In accordance with a fourth aspect of the present invention, a moving member having a hologram scale is characterized in that a recording material is unitarily located on a moving member and under this condition, diffracted beams diffracted by a diffraction grating are caused to interfere with each other as an object wave and a reference wave so as to form a hologram scale on the recording material.

The above and other objects, features, and advantages of the present invention will become apparent in the following detailed description of illustrative embodiments thereof, in which like reference numerals are used to identify the same or similar parts in the several views.

DETAILED DESCRIPTION OF THE PREFERRED EMBODIMENTS

Embodiments of a hologram scale and an apparatus for making such hologram scale according to the present invention will hereinafter be described with reference to the drawings.

Figure 2:
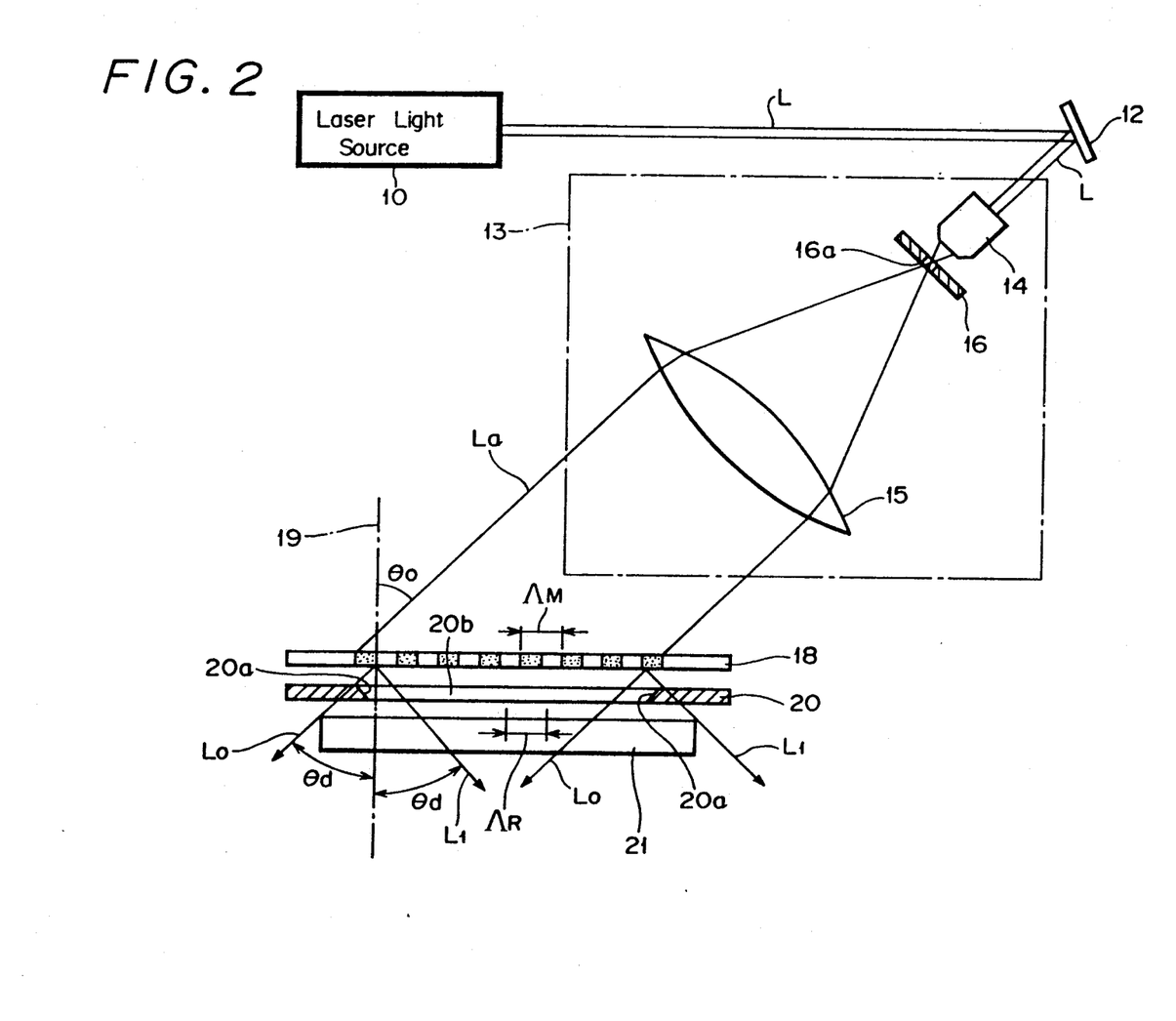
FIG. 2 is a schematic diagram of a first embodiment of the present invention and showing an arrangement of an apparatus for making a hologram scale according to the present invention.

Referring to FIG. 2, shown at 10 is a laser light source, such as a helium neon laser, argon laser, helium cadmium laser or the like and this laser light source 10 emits a laser beam L of wavelength $\lambda$. The laser light L from the laser light source 10 is reflected by a mirror 12 and becomes incident on a beam expander 13. The beam expander 13 is a magnifying optical system and composed of a set of lenses 14, 15 and a pin-hole plate 16 having a pin-hole 16a formed at its center. This beam expander 13 expands the incident laser light L of light bundle into a laser light beam La of relatively thick light bundle and emits the same therefrom.

The laser light beam La from the beam expander 13 becomes incident on a reference diffraction grating 18 (hereinafter referred to as a master scale) having a grating pitch $\Lambda M$ at an incident angle of $\theta_0$ relative to a normal 19 to the master scale 18.

The master scale 18 might be a master scale which measures accuracy of the hologram scale made by the conventional hologram scale making apparatus shown in FIG. 1 and which has a desired average grating pitch $\Lambda M$. The master scale 18 is not limited to the thus selected hologram scale and might be a diffraction grating of high accuracy which is directly written in the recording material by an electron beam or a diffraction grating of high accuracy which is written in the recording material by utilizing lithography technique.

The laser light La incident on the master scale 18 is diffracted by the master scale 18 and emitted as a 0-order diffracted light $L_0$ and a primary diffracted light $L_1$, each having an angle $\theta d$ relative to the normal 19, etc. The 0-order diffracted light $L_0$ and the primary diffracted light $L_1$ interfere with each other as an object wave and a reference wave and pass through a slit 20b of a slit plate 20 having a knife edge 20a, thereby an interference fringe having a grating pitch $\Lambda R$ being formed on a recording material 21. The recording material 21 is secured to the slit plate 20 and the master scale 18 by jigs (not shown) and the recording material 21 in parallel to one another.

In that case, a relation expressed by the following equation (1) is satisfied among the grating pitch $\Lambda R$ of the interference fringe formed on the recording material 21, the wavelength $\lambda$ of the laser light La and the angles $\theta_0$ and $\theta d$.

$$2\pi/\Lambda R = (2\pi/\lambda)\sin\theta_0 + (2\pi/\lambda)\sin\theta d \qquad (1)$$

A relation expressed by the following equation (2) is satisfied among the grating pitch $\Lambda M$ of the master scale 18, the wavelength $\lambda$ of the laser light La and the angles $\theta_0$, $\theta d$.

$$2\pi/\Lambda M = (2\pi/\lambda)\sin\theta_0 + (2\pi/\lambda)\sin\theta d \qquad (2)$$

The right sides of the equations (1) and (2) are equal so that a relation expressed by the following equation (3) is satisfied.

$$\Lambda M = \Lambda R \qquad (3)$$

That is, the interference fringes recorded on the recording material 21, i.e., the grating pitch $\Lambda R$ of the hologram scale and the grating pitch $\Lambda M$ of the master scale 18 become equal to each other.

As described above, according to the embodiment of the present invention, only if the parallelism between the master scale 18 and the recording material 21 is properly maintained do, the grating pitch $\Lambda R$ of the interference fringe and the grating pitch $\Lambda M$ of the master scale 18 become equal to each other without being affected by a small change of the wavelength $\lambda$ of the laser light La or a small change of the incident angle in the recording mode. The recording material 21 on which the interference fringe is exposed and recorded can be utilized as the hologram scale and the grating pitch of the hologram scale is equal to the grating pitch AM of the master scale 18, thereby the hologram scale of high accuracy being formed.

While the hologram scale is formed by using the 0-order diffracted light $L_0$ and the primary diffracted light $L_1$ as described above, the method for forming the hologram scale is not limited thereto and the following modifications thereof can be effected. That is, by utilizing both of the positive and negative primary diffracted beams, it is possible to form the hologram scale whose grating pitch is a half of the grating pitch AM of the master scale 18. Similarly, by utilizing higher-order diffracted beams, it is possible to form a hologram scale whose grating pitch is reduced in inverse proportion to the order of the diffracted light as compared with the grating pitch AM of the master scale 18. In short, by causing at least two of the diffracted beams to interfere with each other as the object wave and the reference wave to thereby form the hologram scale on the recording material, it is possible to obtain an accurate hologram scale whose average grating pitch does not fluctuate. Incidentally, of the two diffracted beams, it is preferable that at least one diffracted beam be the 0-order diffracted light.

According to this embodiment, since the optical path of the laser light split so as to effect the interference is considerably reduced, as compared with that in the example of the prior art shown in FIG. 1, it is possible to suppress the fluctuation of the wave surface due to the vibration of the interferometer or the flow of air in the recording mode. Therefore, it is possible to stably make the hologram scale having excellent linearity and whose grating pitch is equal to that of the master scale.

As a result, by utilizing the thus made hologram scale as the displacement measuring apparatus, displacement can be measured at high accuracy without correcting the average grating pitch.

Further, since the apparatus for making a hologram scale according to this embodiment is not substantially affected by extraneous vibration, it is possible to remove the earthquake-resistant structure of the apparatus for making a hologram scale.

Furthermore, since the interference fringe is stable, the recording (exposing) time can be extended and therefore a recording material of lower recording sensitivity can be employed. Also, since a laser light source which emits a laser light of low intensity can be used due to similar reasons, the apparatus can be simplified in arrangement and improved in reliability.

Figure 3:
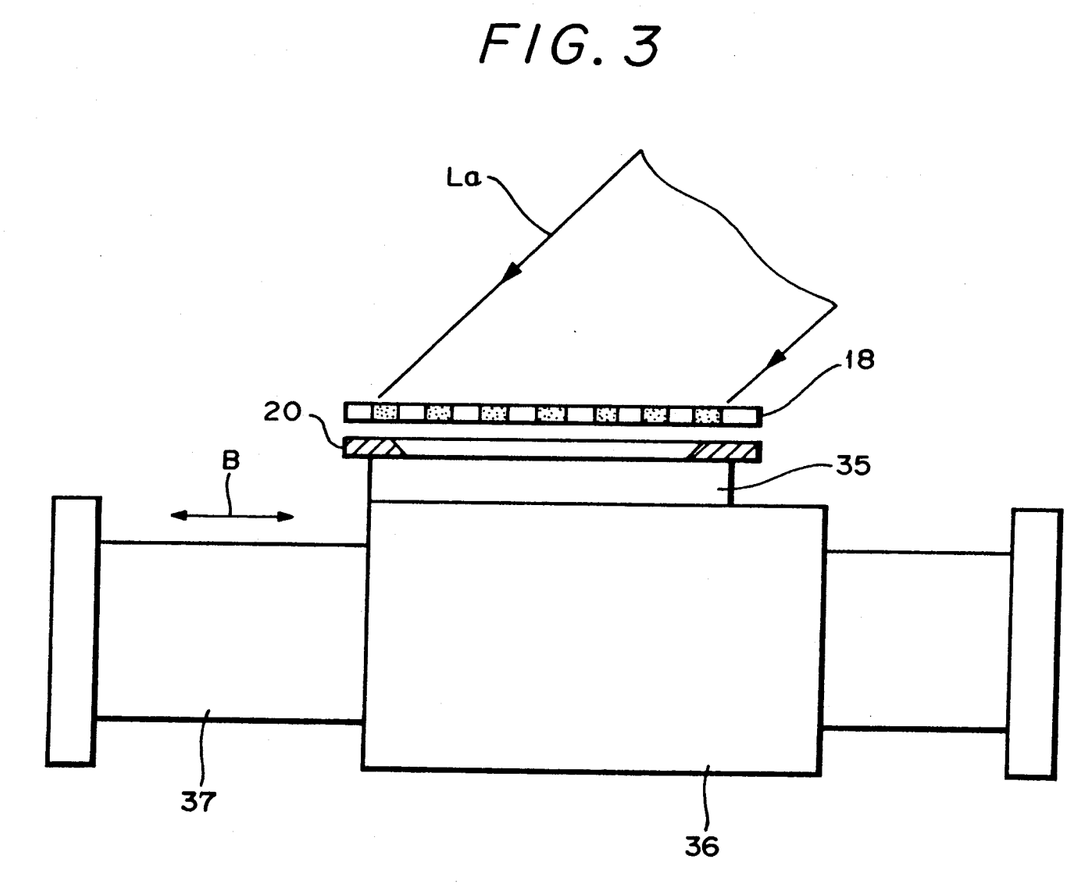
FIG. 3 is a schematic diagram of a second embodiment of the present invention and showing a moving member having a recording material.

FIG. 3 shows an example of the apparatus which can be simplified in arrangement. As shown in FIG. 3, under the condition such that a recording material 35 is unitarily located on a moving member 36 which is slid in the arrow B direction of a displacement measured apparatus, by utilizing the recording material 35 whose development process is simple, it is possible to record a hologram scale on the recording material 35. As a consequence, unlike the prior art in which accuracy is frequently deteriorated when the hologram scale made according to the prior art is attached to the moving member, the deterioration of accuracy of the hologram scale can be prevented beforehand.

In FIG. 3, like parts corresponding to those of FIG. 2 are marked with the same references and therefore need not be described in detail. While the hologram scale is recorded on the recording material 35, the master scale 18 and the slit plate 20 are secured to the moving member 36 by jigs (not shown). Further, in FIG. 3, reference numeral 37 designates a guide rail along which the moving member 36 is slid in the arrow B direction.

Figure 4A:
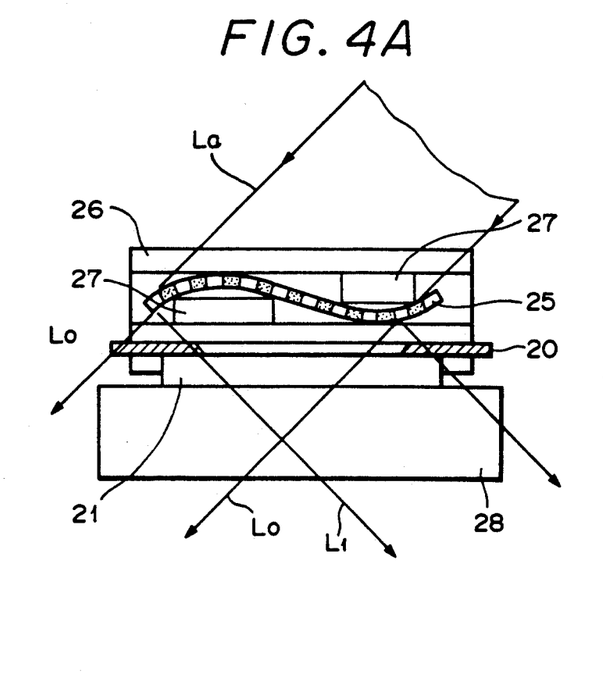
FIGS. 4A and 4B are respectively a front view and a right side view illustrating the condition that a master scale is corrected.
Figure 4B:
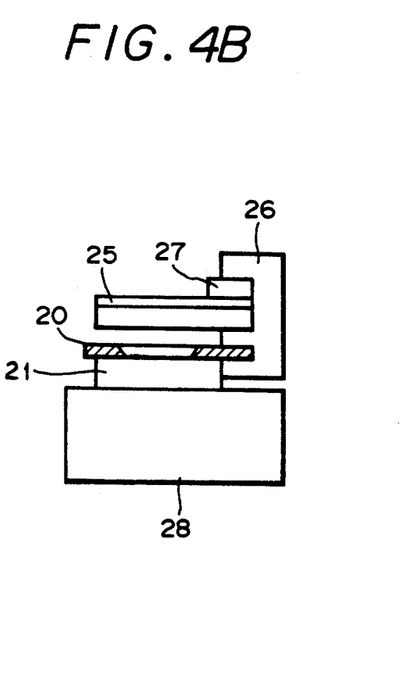

FIG. 4A shows another embodiment of the present invention and FIG. 4B shows a right side view thereof.

As shown in FIG. 4A, a master scale 25 whose grating pitch fluctuates is shown. In this case, the average grating pitch or linearity of the master scale 25 must be corrected. Accordingly, if a hologram scale is formed on a recording material 21 by exposing the interference fringe on the recording material 21 under the condition such that the average grating pitch or linearity of the master scale 25 is corrected by using a supporting device 26 and spacers 27, 27, then it is possible to make a hologram scale of higher accuracy. In FIGS. 4A and 4B, the parts corresponding to those in FIG. 2 are marked with the same references and reference numeral 28 designates a base.

Figure 5:
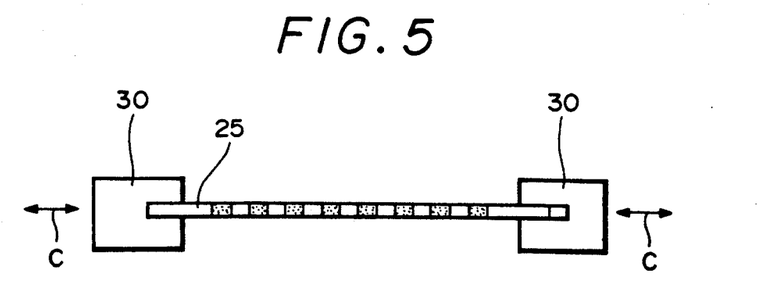
FIG. 5 is a schematic diagram showing another condition that the master scale is corrected.

FIG. 5 shows the condition such that the average grating pitch of the master scale 25 is corrected. As shown in FIG. 5, the average grating pitch of the master scale 25 can be changed by moving supporting devices 30, 30 for the master scale 25 in the arrow C direction. Accordingly, if a hologram scale is formed under the above condition, then it is possible to obtain a hologram scale having a desired average grating pitch.

Further, according to the present invention, since the optical path is considerably reduced after having been subjected to the object wave and the reference wave, the linearity and the average grating pitch of the thus made hologram scale can be substantially prevented from fluctuating even by the change of circumstance conditions, such as ambient temperature, flow of wind or the like. Accordingly, a long hologram scale shown in FIG. 6 can be formed.

Figure 6:
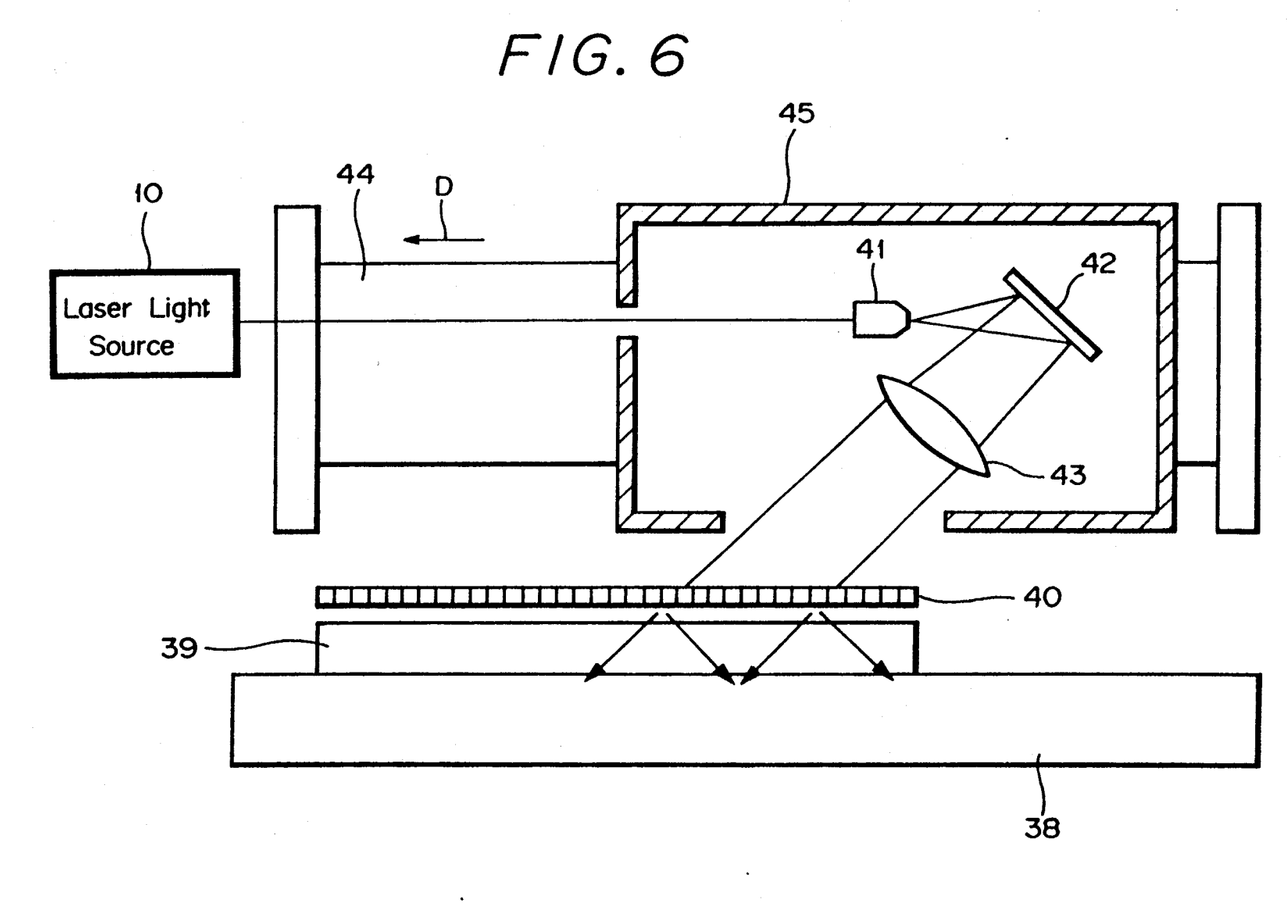
FIG. 6 is a schematic diagram of a third embodiment of the present invention and showing an arrangement of an apparatus for making a long hologram scale according to the present invention.

In FIG. 6, reference numeral 38 designates a base table and a long recording material 39 and a long master scale 40 are secured to this base table 38. A moving box 45 in which a lens 41, a mirror 42 and a lens 43 constituting a magnifying optical system are fixed at predetermined positions is slid along a guide rail 44 located in parallel to the base table 38 in the arrow D direction, so that it is possible to form a long hologram scale having excellent linearity on the recording material 39. According to this method in which the long hologram scale is formed on the long recording material 39 by moving the optical system by using the long master scale 40, fine positioning is not needed and a manufacturing efficiency can be increased considerably.

According to the apparatus for making a hologram scale of the present invention, since the hologram scale is formed on the recording material by causing the diffracted beams to interfere with each other as an object wave and the reference wave, it is possible to obtain the accurate hologram scale whose average grating pitch does not fluctuate substantially. There is then the advantage that the displacement measuring apparatus using the hologram scale made by the above apparatus needs no cumulative correction or the like.

According to the apparatus for making a hologram scale of the present invention, since the optical path of the laser light can be reduced considerably, the fluctuation of wave surface due to the vibration of the interferometer or the flow of air in the recording mode can be suppressed to the minimum, it is possible to stably construct a hologram scale having excellent linearity and whose grating pitch is equal to that of the reference diffraction grating.

According to the apparatus for making a hologram scale of the present invention, since the apparatus of the present invention can be substantially prevented from being affected by the extraneous vibration, the earthquake-resistant structure of the hologram scale recording apparatus can be removed.

Further, according to the apparatus for making a hologram scale of the present invention, since the interference fringe is stably obtained, the recording (exposure) time can be extended and hence recording material of low recording sensitivity can be used. Also, since the laser light source which emits a laser light low in intensity can be utilized due to similar reasons, the arrangement of the apparatus can be simplified and reliability of the apparatus can be increased.

Further, since the apparatus for making a hologram scale of the present invention is adapted to correct the reference diffraction grating in use, there is then the advantage that the resultant hologram scale becomes more accurate.

Further, according to the apparatus for making a hologram scale of the present invention, it is possible to make a very accurate hologram scale by using the hologram scale as the reference diffraction grating.

Furthermore, according to the hologram scale of the present invention, since the hologram scale is formed on the recording material by causing the diffracted beams to interfere with each other as the object wave and the reference wave, the hologram scale of the present invention becomes accurate and has no fluctuation of average grating pitch.

In addition, according to the moving member having a hologram scale of the present invention, since the recording material is unitarily located on the moving member and under this condition the diffracted beams are caused to interfere with each other as the object wave and the reference wave to thereby form the hologram scale on the recording material, it is possible to obtain the moving member having a hologram scale with ease.

Figure 7:
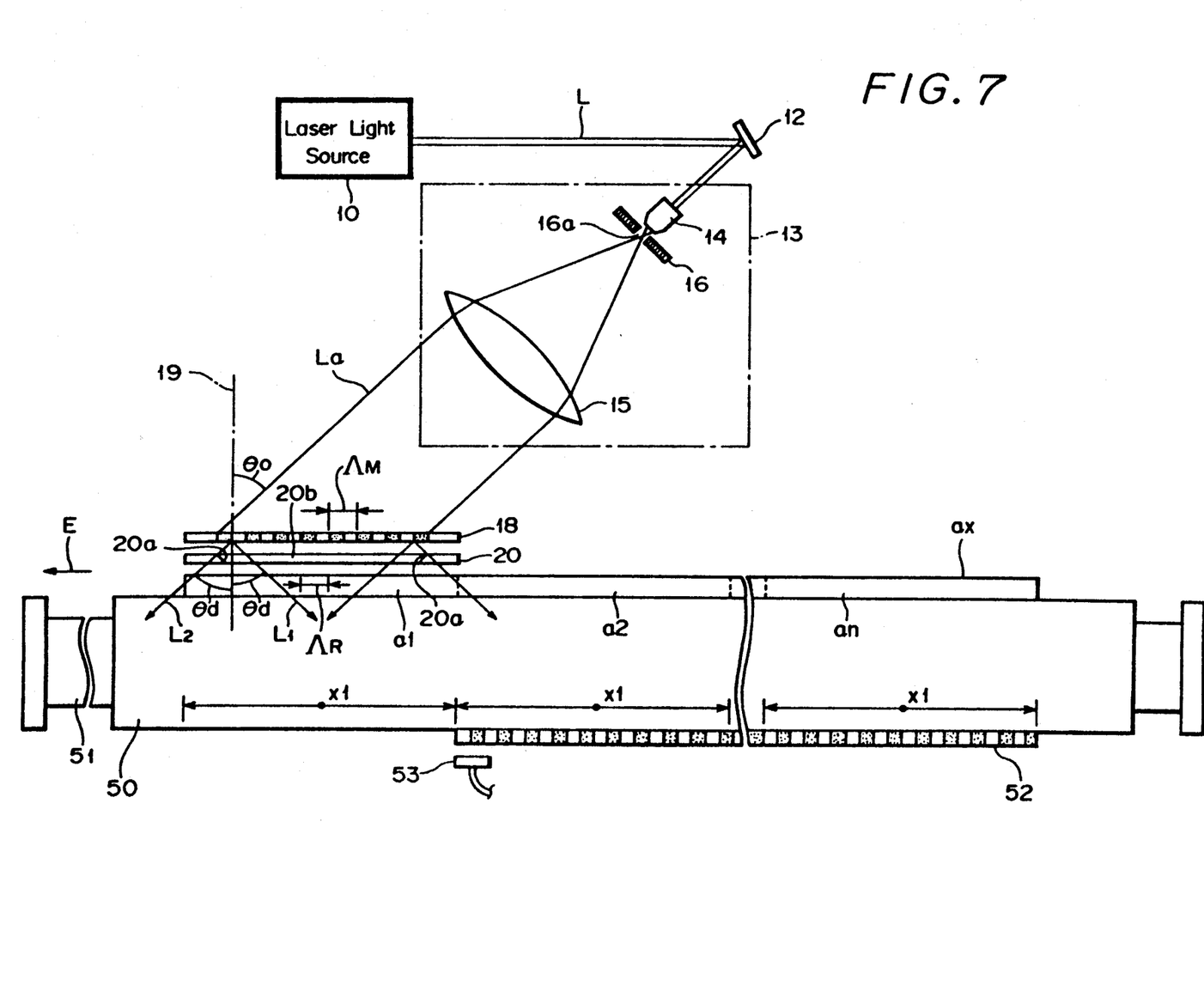
FIG. 7 is a schematic diagram of a fourth embodiment of the present invention and showing an arrangement of an apparatus for making an assembled hologram scale.
Figure 8:
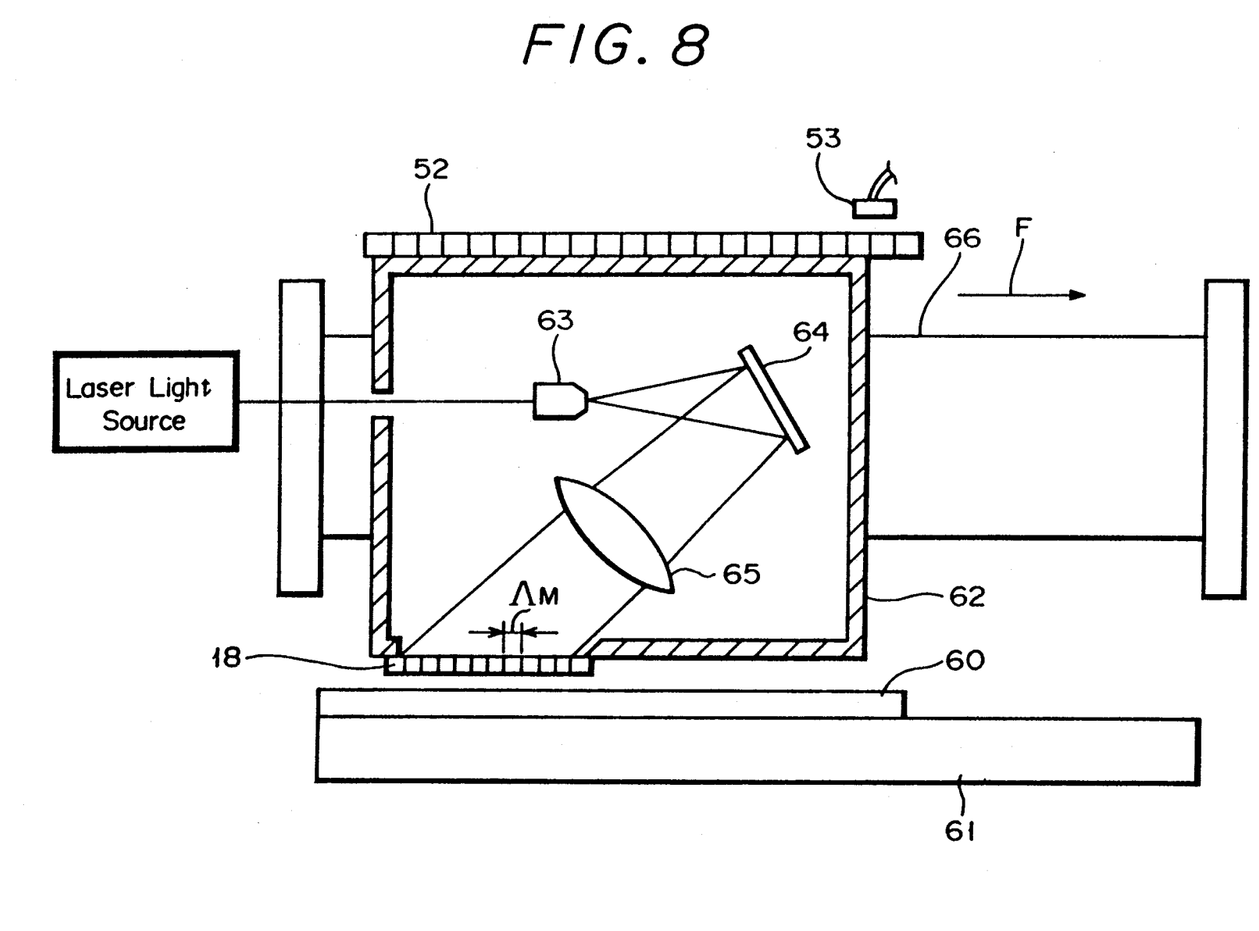
FIG. 8 is a schematic diagram of a fifth embodiment of the present invention and showing an arrangement of an apparatus for making an assembled hologram scale.

Further embodiments of the present invention, i.e., an assembled hologram scale and an apparatus for making an assembled hologram scale according to the present invention will be described with reference to FIGS. 7 and 8. In FIG. 7, like parts corresponding to those of FIG. 2 are marked with the same references and therefore need not be described in detail. The embodiment shown in FIG. 7 is different from the earlier-noted embodiment of FIG. 2 as follows.

The laser light La incident on the master scale 18 is diffracted by the master scale 18 and emitted as a 0-order diffracted beam $L_0$ and a primary diffracted beam $L_1$, each having an angle $\theta d$ relative to the normal 19 to the master scale 18, etc. The 0-order diffracted beam $L_0$ and the primary diffracted beam $L_1$ interfere with each other as the object wave and the reference wave and pass through the slit 20b of the slit plate 20 having the knife edge 20a, thereby the interference fringe having the grating pitch $\Lambda R$ is formed on a recording material a1 formed of a long recording material ax. The recording material a1, the slit plate 20 and the master scale 18 are secured to a slide table 50 by jigs (not shown) and they are located in parallel to one another. Further, although the long recording material ax is represented as an assembly of recording materials a1 to an in FIG. 7, they are made as a unitary body in actual practice.

In accordance with the above-mentioned equations (1), (2) and (3), the interference fringe recorded on the recording material a1, that is, the grating pitch $\Lambda R$ of the hologram scale and the grating pitch $\Lambda M$ of the master scale 18 become equal to each other.

As described above, only if the parallelism between the master scale 18 and the recording material a1 is accurately maintained the do grating pitch $\Lambda R$ of the interference fringe and the grating pitch $\Lambda M$ of the master scale 18 become equal to each other without being affected by the small change of the wavelength $\lambda$ of the laser light La or the small change of incident angle in the recording mode. Since the recording material a1 on which the interference fringe is exposed and recorded can be utilized as the hologram scale and the grating pitch of this hologram scale is equal to the grating pitch $\Lambda M$ of the master scale 18, it is possible to make a hologram scale of high accuracy.

Then, by moving the slide table 50 along the guide rail 51 in the arrow E direction by the length x1 which is an integral multiple of the grating pitch $\Lambda M$, the recording material a2 is located at the position in which the recording material a1 was located before.

The assembled hologram scale can be made by exposing and recording the interference fringe on the recording material a2 similarly as described above. Further, by exposing and recording the interference fringe on the recording material while the recording materials a3 to an are sequentially moved in the arrow E direction by the length x1 which is the integral multiple of the grating pitch $\Lambda M$, it is possible to make a long assembled hologram scale corresponding to the long recording material ax formed of the recording materials a1 to an.

In that case, the moving distance of the length x1 is set as follows. A scale of a positioning scale 52 unitarily located on the slide table 50 is read by a photo sensor 53 and a pulse signal derived from the photo sensor 53 is counted by a counter (not shown), thereby the moving distance of the length x1 is set. The method for setting the above moving distance of the length x1 is not limited to the above and a positioning scale formed in parallel to the master scale 18 when the master scale 18 is formed may be used. Alternatively, it is possible that the movement of the slide table 50 can be measured by an optical wave interferometer.

While in the above embodiment the optical system (laser light source 10 and beam expander 13) is fixed and the long assembled hologram scale is made as described above, the apparatus for making the long assembled hologram scale is not limited to the above and the following embodiment can be employed. That is, as shown in FIG. 8, a long recording material 60 is located on a fixed base table 61 and a moving box 62, in which a lens 63, a mirror 64 and a lens 65 constituting the magnifying optical system are fixed at predetermined positions and which has the master scale 18 secured thereto at the position opposing to the recording material 60, is sequentially moved along a guide rail 66 which is located in parallel to the base table 61 by an integral multiple of the grating pitch $\Lambda M$ in the arrow F direction so as to expose an interference fringe on the recording material 60. Then, it is possible to form the long assembled hologram scale of excellent linearity on the recording material 60.

While in the above embodiment the long assembled hologram scale is formed by using the 0-order diffracted light and the primary diffracted light, the apparatus for forming the long assembled hologram scale is not limited thereto and the following modifications thereof can be effected. That is, by utilizing both of the positive and negative primary diffracted beams, it is possible to form the long assembled hologram scale whose grating pitch is a half of the grating pitch ΛM of the master scale 18. Similarly, by utilizing higher-order diffracted beams, it is possible to form a long assembled hologram scale whose grating pitch is reduced in inverse proportion to the order of the diffracted beams as compared with the grating pitch ΛM of the master scale 18. In short, by causing at least two of the diffracted beams to interfere with each other as the object wave and the reference wave to thereby form the hologram scale on the recording material and the master scale is relatively moved to the recording material sequentially by an integral multiple of the grating pitch ΛM each to expose and record, it is possible to obtain an accurate long assembled hologram scale whose average grating pitch does not fluctuate. Incidentally, it is preferable that at least one diffracted beam of the two diffracted beams be the 0-order diffracted beam.

According to this embodiment, since the optical path of the split laser beams so as to effect the interference is considerably reduced as compared with that in the example of the prior art shown in FIG. 1, it is possible to suppress the fluctuation of the wave surface due to the vibration of the interferometer or the flow of air in the recording mode to the minimum. Therefore, it is possible to make a long assembled hologram scale having excellent linearity and whose grating pitch is equal to that of the master scale.

As a result, by utilizing the thus made long assembled hologram scale as the displacement measuring apparatus, displacement can be measured at high accuracy without correcting the average grating pitch.

Further, since the long assembled hologram scale recording apparatus according to this embodiment is not substantially affected by extraneous vibration, it is possible to remove the earthquake-resistant structure of the long assembled hologram scale recording apparatus.

Furthermore, since the interference fringe is stable, the recording (exposing) time can be extended and therefore a recording material of low recording sensitivity can be employed. Also, since a laser light source which emits a laser light of low intensity can be used due to similar reason, the apparatus can be simplified in arrangement and improved in reliability.

According to this embodiment of the apparatus for making an assembled hologram scale of the present invention, when at least two of the beams diffracted by the reference diffraction grating are caused to interfere with each other as the object wave and the reference wave to thereby form the long assembled hologram scale on the recording material, by moving the recording material by the length of an integral multiple of the grating pitch of the reference diffraction grating so as to form the assembled hologram scale on this recording material, it is possible to form an accurate long assembled hologram scale whose average grating pitch does not fluctuate.

Also, according to the present invention, when at least two of the beams diffracted by the reference diffraction grating are caused to interfere with each other as the object wave and the reference wave to thereby form the long assembled hologram scale on the recording material, by moving the above reference diffraction grating by the length of an integral multiple of the grating pitch of the reference diffraction grating so as to form the assembled hologram scale on the recording material, it is possible to form an accurate long assembled hologram scale whose average grating pitch does not fluctuate.

Accordingly, there is then the advantage that the displacement measuring apparatus using the long assembled hologram scale made by the apparatus of the present invention needs no accumulative correction or the like.

According to this embodiment, since the optical path of the laser beams can be considerably reduced, it is possible to suppress the fluctuation of wave surface due to the vibration of the interferometer or the flow of air in the recording mode to the minimum. Therefore, it is possible to make a long assembled hologram scale having excellent linearity and whose grating pitch is equal to that of the master scale.

Further, since the long assembled hologram scale recording apparatus according to this embodiment is not substantially affected by the extraneous vibration, it is possible to remove the earthquake-resistant structure of the long assembled hologram scale recording apparatus.

Furthermore, since the interference fringe is stable, the recording (exposing) time can be extended and therefore a recording material of low recording sensitivity can be employed. Also, since a laser light source which emits a laser beam of low intensity can be used for a similar reason, the apparatus can be simplified in arrangement and improved in reliability.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. An apparatus for making a hologram scale comprising:
   a reference diffraction grating on which light is incident and from or by which said incident light is emitted or reflected as diffracted light comprising a zero-order diffracted beam and at least one additional diffracted beam;
   a slit plate having a slit formed therein, boundaries of said slit being formed with knife edges, and said slit plate being arranged adjacent said reference diffraction grating to pass a portion of light beams diffracted by said reference diffraction grating; and
   a recording medium whereon at least two diffracted beams of said diffracted light including said zero-order diffracted beam are caused to interfere with each other as an object wave and a reference wave so as to form a hologram scale on said recording medium.

2. An apparatus for making a hologram scale according to claim 1 wherein an assembled hologram scale is formed on said recording medium by moving said recording medium relative to said reference diffraction grating by a length equal to an integral multiple of a grating pitch of said reference diffraction grating.

3. An apparatus for making a hologram scale according to claim 1 wherein an assembled hologram scale is formed on said recording medium by moving said reference diffraction grating relative to said recording medium by a length equal to an integral multiple of a grating pitch of said reference diffraction grating.

4. An apparatus for making a hologram scale according to claim 1 wherein said reference diffraction grating includes a hologram scale.

5. A moving member having a hologram scale comprising:
- a reference diffraction grating having a selected grating pitch;
- a recording medium; and
- a moving member for moving said recording medium relative to said reference diffraction grating by an integral multiple of said grating pitch;
- wherein light beams diffracted by a diffraction grating are caused to interfere with each other as an object wave and a reference wave so as to form a hologram scale on said recording medium.

6. An apparatus for making a hologram scale comprising:
- a reference diffraction grating in which a grating pitch thereof has fluctuations, so that said reference diffraction grating does not lie in a single plane, and by which incident light is emitted as diffracted light having a zero-order beam and a primary diffracted beam;
- spacer means arranged on said reference diffraction grating at locations corresponding to said fluctuations;
- a supporting device for holding said spacer means in contact with said fluctuations and for supporting said reference diffraction grating;
- a slit plate having a slit formed therein, boundaries of said slit being formed with knife edges, said slit plate being arranged adjacent said reference diffraction grating to pass a portion of light beams diffracted by said reference diffraction grating; and
- a recording medium whereon at least two diffracted beams of said diffracted light beams passed by said slit plate and including said zero-order beam and said primary diffracted beam are caused to interfere with each other as an object wave and a reference wave so as to form a hologram scale on said reference medium.

* * * * *